(12) United States Patent
Wang et al.

(10) Patent No.: US 10,360,521 B2
(45) Date of Patent: Jul. 23, 2019

(54) DYNAMIC LOCATION RECOMMENDATION FOR PUBLIC SERVICE VEHICLES

(71) Applicant: SAP SE, Walldorf (DE)

(72) Inventors: Mengjiao Wang, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 937 days.

(21) Appl. No.: 14/737,508

(22) Filed: Jun. 12, 2015

(65) Prior Publication Data

US 2016/0364669 A1 Dec. 15, 2016

(51) Int. Cl.
*G06Q 10/06* (2012.01)

(52) U.S. Cl.
CPC .............. *G06Q 10/06315* (2013.01)

(58) Field of Classification Search
CPC .............. G06Q 10/00; G06Q 30/02
USPC .................................. 705/7.11–7.42
See application file for complete search history.

(56) References Cited

U.S. PATENT DOCUMENTS

| | | | |
|---|---|---|---|
| 8,738,289 B2 | 5/2014 | Ghoting et al. | |
| 2002/0062236 A1* | 5/2002 | Murashita | G06Q 10/02 705/5 |
| 2012/0265580 A1* | 10/2012 | Kobayashi | G06Q 30/02 705/7.31 |
| 2013/0132140 A1* | 5/2013 | Amin | G06Q 10/02 705/7.13 |
| 2013/0144831 A1* | 6/2013 | Atlas | G06N 5/02 706/50 |
| 2013/0159059 A1 | 6/2013 | Malov | |
| 2014/0180566 A1 | 6/2014 | Malhotra | |
| 2014/0257681 A1* | 9/2014 | Kummamuru | G08G 1/123 701/117 |
| 2015/0142518 A1* | 5/2015 | Farinha Gomes Felix | G06Q 30/0202 705/7.31 |
| 2016/0117610 A1* | 4/2016 | Ikeda | G06Q 10/02 705/5 |
| 2016/0335576 A1* | 11/2016 | Peng | G06Q 10/06315 |

OTHER PUBLICATIONS

Luis Moreira-Matias et al., Predicting Taxi-Passenger Demand using Streaming Data, 2012, IEEE Conference on Intelligent Transportation Systems (ITSC).

(Continued)

*Primary Examiner* — Robert D Rines
(74) *Attorney, Agent, or Firm* — Klarquist Sparkman, LLP

(57) ABSTRACT

A recommendation system for generating location recommendations for drivers of public service vehicles is disclosed. The system segments a map of an area of interest into segments or regions and analyzes historical call data to estimate demand in the regions. The analysis also determines values of the calls in the regions. For example, the analysis estimates the probability of the calls and values of such calls in each region. The analysis may include time patterns to improve accuracy of the estimation. By using the results of the analysis along with current information, such as current location of a vehicle, current time, and real-time traffic information, a holding location recommendation is generated.

20 Claims, 5 Drawing Sheets

(56) References Cited

OTHER PUBLICATIONS

Jing Yuan et al., Where to Find My Next Passenger?, UbiComp'11, Sep. 2011, ACM, Beijing, China.
Marco Veloso et al., Taxi Driver Assistant—A Proposal for a Recommendation System, 2001, ACM.
Luis Moreira-Matias et al., An Online Recommendation System for the Taxi Stand choice Problem (Poster), 2012, IEEE Conference on Vehicular Networking Conference (VNC).

\* cited by examiner

DYNAMIC LOCATION RECOMMENDATION FOR PUBLIC SERVICE VEHICLES

TECHNICAL FIELD

The present disclosure relates to computer systems and applications, and more particularly, to a framework for providing dynamic location recommendations for public service vehicles.

BACKGROUND

Public service vehicles, such as taxis, service requests from passengers. For example, a passenger may call a taxi service center to request a taxi. An available taxi close by to the location of the passenger may service the request. In a metropolis, passenger requests may come from different areas. Moreover, requests may be of different values. For example, some passenger requests generate more revenues than others based on distance destination from the pickup point. From a taxi driver or dispatcher's perspective, the ideal situation would be to provide taxis proximate to high value requests. However, it is difficult to determine which locations have high value requests. Furthermore, the number of taxis dispatched to high value locations should not exceed the demand. Otherwise, resources are wasted.

From the foregoing discussion, it is desirable to provide a recommendation system with high-value recommendations.

SUMMARY

A framework for generating location recommendations for public service vehicles is described herein. In accordance with one aspect, the framework includes a computer-implemented method performed by a computer system. The method includes providing a map to the computer system. The map is of a geographical area of interest which is segmented into N number of regions. Historical call data is analyzed to estimate demand distributions in the N regions. Current data is provided. The demand distributions are analyzed with the current data to generate a list of candidate regions to recommend to a user.

In another aspect, a location recommendation system is disclosed. The recommendation system includes a data source with a historical data module and a current data module. The historical data module includes historical call records. The current data module is provided with current data. The system also includes an analyzer with a map segmentation module, a demand estimation module, a candidate location generation module and a location selection module. The map segmentation module includes a map of a geographical area of interest which is segmented into N number of regions. The demand estimation module analyzes the historical call records in the historical data module to estimate demand distributions in the N regions. The candidate location generation module generates a list of candidate regions based on the demand distributions and current data. The location selection module selects a selected region from the list of candidate regions to recommend to a user.

In yet another aspect, a non-transitory computer-readable medium having stored thereon a program code is disclosed. The program code is executable by a computer for generating recommendations of locations which include providing a map of a geographical area of interest which is segmented into N number of regions. The historical call data is analyzed to estimate demand distributions in the N regions. Current data is received. The demand distributions are analyzed with the current data to generate a list of candidate regions to recommend to a user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
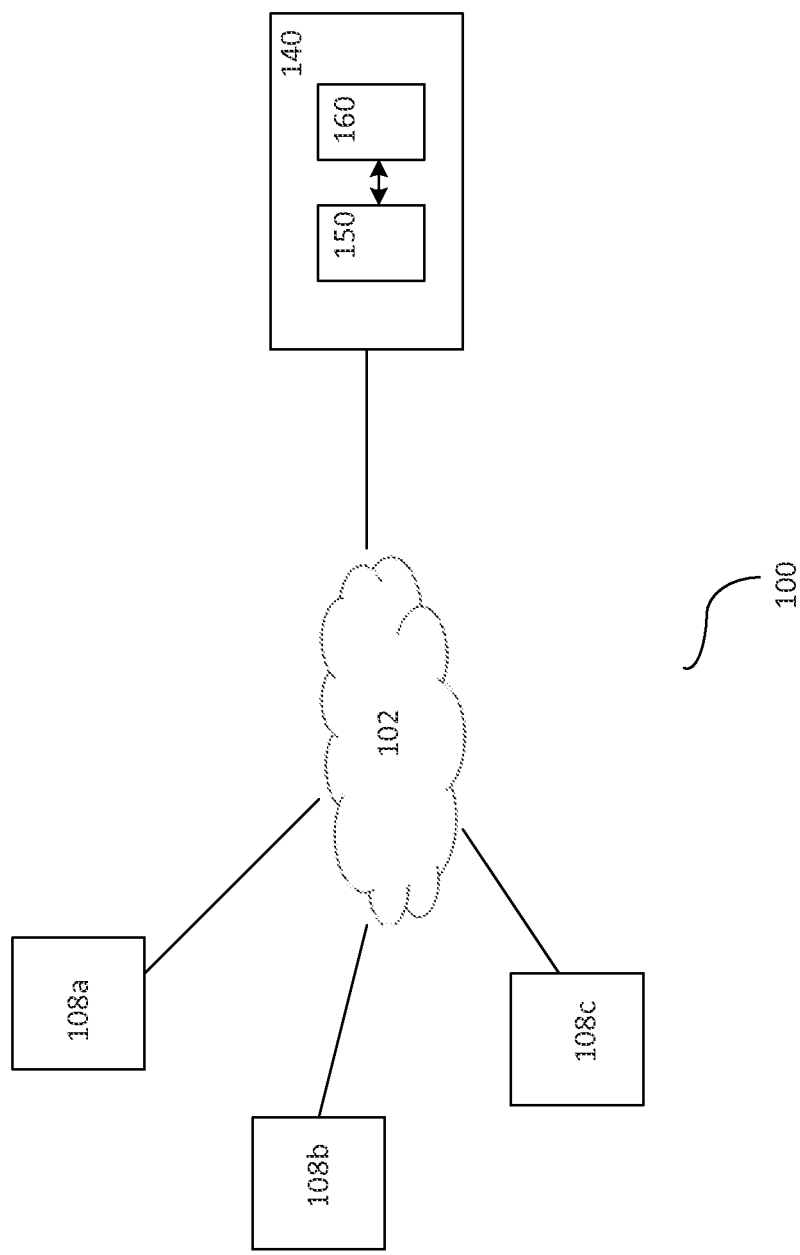
FIG. 1 shows a simplified diagram of a location recommendation environment.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework is provided for generating location recommendations to drivers of public service vehicles. Public service vehicles are vehicles which provide service to the public. Public service vehicles may be dispatched to service a request. Public service vehicles, for example, may include taxis, ambulances, fire engines and police cars. Other types of public service vehicles may also be useful. The framework may be configured to provide location recommendations of a specific type of public service vehicle. For example, the framework may be a dedicated framework for generating location recommendations for a specific type of public service vehicle, such as taxis or other types of public service vehicles. Configuring the framework to provide location recommendations for multiple types of public service vehicles may also be useful. For example, the framework may be a general framework which provides location recommendations for more than one type of public service vehicle, such as fire engines and ambulances.

The location recommendations are within a geographical area of interest. For example, the geographical area of interest may be a town, a municipality a city, a region of a state, or a state. Other types of geographical areas of interest may also be useful. The size of the area may depend on, for example, the type of application. In one implementation, the framework provides recommendations of holding locations which optimizes or increases likelihood of servicing a request. For example, the framework provides recommendations of optimal holding locations for public service vehicles. For example, the framework provides recommendations of locations for a public service vehicle, such as a taxi, to wait for a request for service.

The framework, in one implementation, utilizes historical information to generate the recommendations. Historical information is historical demand information, which may include location and time of request. The historical information is analyzed to estimate a demand distribution at different locations during different times. Using the demand distribution information along with current information, such as current location, current time, and real-time traffic information, the framework generates the location recommendations.

FIG. 1 shows a simplified diagram of all exemplary environment 100. The environment 100, for example, includes a recommendation system 140. The recommendation system may act as a server and operate in a networked environment with user devices 108a-108c. For example, the recommendation system may have a distributed architecture, such as a client-server architecture. Other types of architectures may also be useful. A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for user devices 108a-108c, they may be any local computing devices. A computing device, for example, includes a local memory and a processor. The computing device may further include a display. The display may serve as an input and output component of the user device, in some cases, a keyboard or pad may be included to serve as an input device. The memory may be volatile or non-volatile types of non-transitory computer-readable media such as magnetic media, optical media, RAM, ROM, removable media, or any other suitable local or remote memory component. Various types of processing devices may serve as a user device. For example, the user device may be a personal computer (PC), a tablet PC, a workstation, a network computer or a mobile computing device, such as a laptop, a tablet or a smart phone. Other types of processing devices may also be used.

In one implementation, some user devices may be mobile devices. A mobile user device is installed in a vehicle. The mobile device, in one implementation, is installed in a public service vehicle. Non-mobile user devices may also be provided. Non-mobile user devices may be used by, for example, an administrator or dispatcher of the recommendation system. Other configurations of user devices may also be useful.

The various components of the network may be connected through a communication network 102. For example, components of the network may be connected by internet, intranet, LAN, WAN or a combination thereof. Other type of networks or network connections may also be useful. For example, the network connections may include a WIFI or a 3G/4G/LTE connection. In some cases, the network may be a cloud.

A user may connect to the server using a user device. For example, the user device may include a browser for connecting to the analysis system. The user device may be referred to as the client side while the analysis system may be referred to as the server side. Other types of configurations for the analysis system may also be useful.

The recommendation system, in one implementation, includes a data source 150 and a recommender or analyzer 160. The recommendation system may include other components.

The data source, in one implementation, includes historical and current data or information. Historical data, for example, includes historical call records. The historical call records are records of previous calls for public service vehicles of interest. For example, the historical call records are records of calls for taxis. Providing historical call records for other types of public service vehicles or more than one type of public service vehicle may also be useful. The historical data may be from a call center which receives calls and dispatches vehicles.

The historical call records may be stored in a database. For example, the historical call records may be stored in memory of a database. Various types of databases may be employed. For example, the database may be a relational database or Structured Query Language (SQL)-based database, such as SAP HANA database from SAP SE. Other types of databases may also be useful.

As for current data, it may include real-time traffic information. The current data may also include real-time vehicle status information, such as availability and location. Other types of current information may also be included. The current data may be obtained from, for example, current data application program interfaces (APIs). Such APIs may include, for example, Google map, global positioning service (GPS) and communication devices. Other types of APIs may also be useful.

The analyzer analyzes historical and current data to generate location recommendations. For example, the analyzer analyzes the historical data statistically and estimates demand based on location and time. To increase accuracy, the time component may be daily, weekly and monthly patterns of demand. The analysis produces a list of candidate locations for recommendation. Using current data, the analyzer selects a location or locations from the list to recommend to a driver of a public service vehicle. For example, based on current location of a driver and current time and current traffic conditions, the analyzer selects a location or locations from the list to recommend to a driver.

The location recommendations, for example, are provided to a user device of a driver. The recommendations, for example, may be shown on the display of the user device. In some embodiments, the location recommendations may be overlaid onto a map. For example, the user device may include a geographical information system (GIS) component. Other techniques for displaying the recommendations may also be useful.

The recommendation system may track the number of public service vehicles recommended for a location. Based on historical information, the number of vehicles which a location would need may be estimated. This enables the system to prevent recommending too many vehicles to a specific location. For example, when enough vehicles have been recommended for a specific location, the system recommends the next location or other candidate locations on the list.

The recommendation system may be a web-based system. For example, users may access the recommendation system using a browser on the user devices. In some cases, a driver may access the recommendation system to receive location recommendations. In other cases, a dispatcher may access the recommendation system to dispatch the location recommendations to the driver.

As described, the recommendation system contains both a data source and an analyzer. The data source and analyzer may be contained in a server. For example, the data source and analyzer may be contained in a single server, which serves as the recommendation system server. In one implementation, the recommendation server may be a relational database or SQL-based database, such as SAP HANA, which contains both the data source and analyzer. Alternatively, the data source and analyzer may be contained in separate servers. Other configurations of the recommendation system may also be useful.

Figure 2:
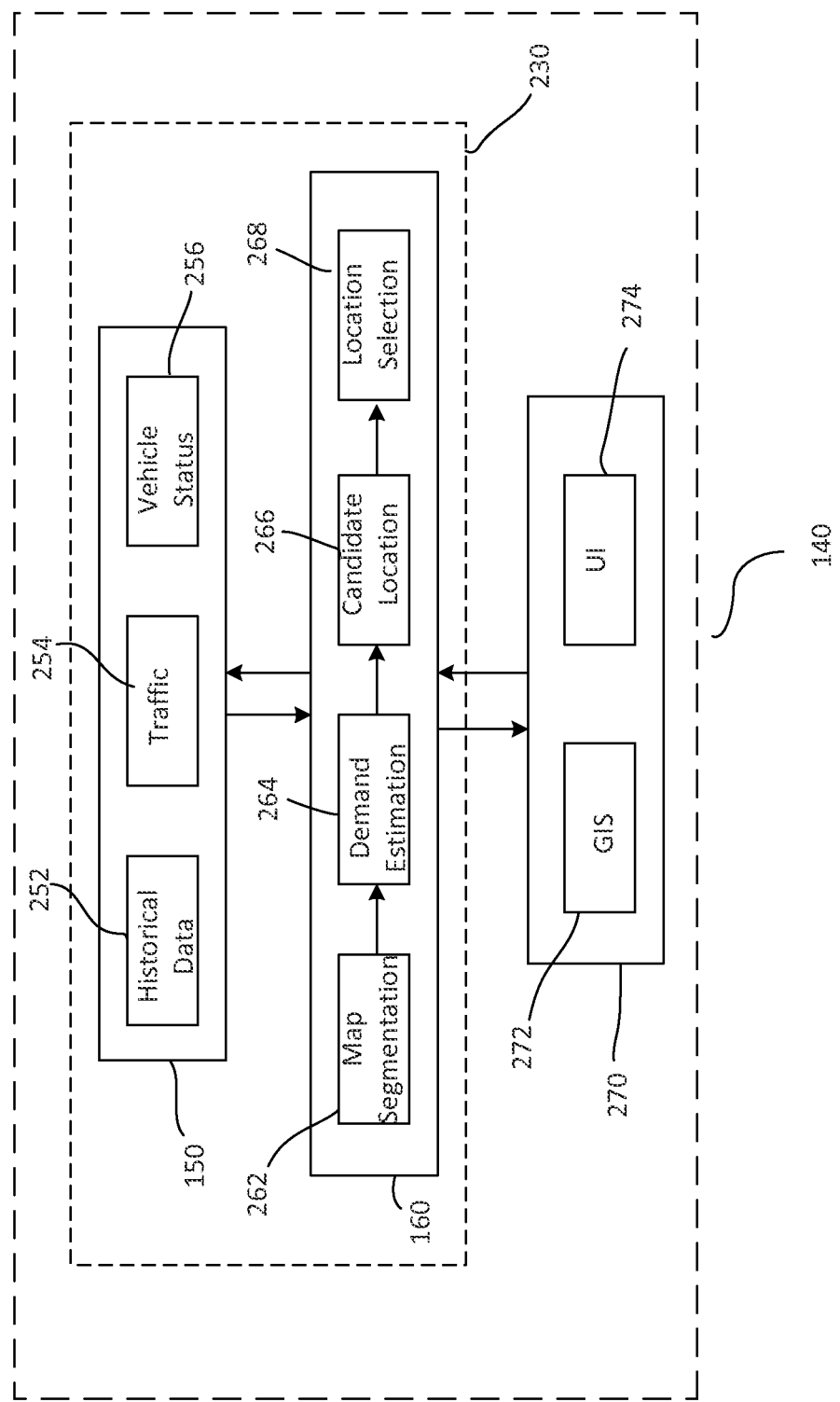
FIG. 2 shows a block diagram of an embodiment of a recommendation system.

FIG. 2 shows a block diagram of an embodiment of a recommendation system 140. The recommendation system may have a client-server architecture. For example, the recommendation system may include a server component 230 and a client component 270. The server component resides on a server while the client component resides on a user device. In one implementation, the recommendation system is a web-based system. For example, the server component of the system may be accessed by a user using a web browser which is part of the client component on the user device. Other configurations of the recommendation system may also be useful.

As shown, the server component includes a data source 150 and a recommender or analyzer 160. Providing other elements for the server components may also be useful.

The data source, in one implementation, includes a historical data module 252. The historical data module contains historical data. In one implementation, the historical data module contains historical call records. Other types of historical data may also be contained in the historical data module. Historical call records, for example, are records of previous calls for the type of public service vehicle of interest. For example, the historical call records are records of calls for taxis. Providing historical call records for other types of public service vehicles or more than one type of public service vehicle may also be useful. The historical data is used to estimate need of service based on location and time.

Various techniques may be used to collect historical call data. Such techniques include a collecting call data center which receives service calls. In other cases, historical call data may be non-call services, such as a taxi being waved down on the street. Non-call services may be collected by the drivers and forwarded to the call center for combining with service calls. Other techniques for collecting historical call data may also be useful. Historical call data may be updated periodically. For example, historical call data may be updated on a daily basis, weekly basis or monthly basis. Updating the historical call data in real-time may also be useful.

Historical call data records may have a data structure or schema as shown below in Table 1:

TABLE 1

| Data Field Name | Data Type | Description |
| --- | --- | --- |
| Vehicle ID | String or Numeric | An identifier to the vehicle and it can be anonymized. |
| Starting Point | Numeric | Longitude and latitude |
| Starting Time | Timestamp | The timestamp that this order starts. |
| Destination Point | Numeric | Longitude and latitude |
| Arrival Time | Timestamp | The timestamp that this order has finished. |
| Weight | String or Numeric | For taxi, the weight can be profit/revenue of each order. For ambulance/fire truck/police car, the weight can be an importance value to indicate the degree of importance of the call. |

As shown, a record includes Vehicle ID, Starting Point, Starting Time, Destination Point, Arrival Time and Weight fields. The type and description of the various fields are described in the table. Providing historical call data records having other fields or schemas may also be useful.

The historical call records may be stored in a database. For example, the historical call records may be stored in memory of a database. Various types of databases may be employed. For example, the database may be a relational database or Structured Query Language (SQL)-based database, such as SAP HANA database from SAP SE. Other types of databases may also be useful.

The data source may further include modules for providing current data. The data source, in one implementation, includes a traffic module 254 and a vehicle status module 256 for providing current data automatically. The traffic module and vehicle status module provides current data which is real-time data automatically. It is understood that real-time data may be slightly delayed, but is effectively considered as real-time data. The delay, for example, may be due to processing and communication delays. There may be other types of delays.

In one implementation, the traffic module provides real-time traffic information while the vehicle status module provides real-time vehicle locations and their status, including the vehicle's heading direction, automatically. The real-time data may be provided by, for example, APIs. In one embodiment, the traffic module obtains real-time traffic information from a third party API, such as Google Map API or Bing Map API. As for real-time vehicle status data, it may be provided by UPS APIs. For example, a UPS device or API may be used to detect vehicle location and direction of travel. The UPS information may be provided by sensors or smartphones. Obtaining real-time data by other techniques may also be useful. For example, availability information may be provided by the driver through a communication API or device.

In some implementations, real-time data is not automatically provided. For example, the data source may not include a traffic and/or vehicle status module to provide current data, which is real-time data, automatically. In such cases, the system may obtain current data using other techniques. For example, a vehicle's time to a location may be estimated based on distance. As for vehicle location, drivers may manually provide such information a when a request for recommendation is made. Other techniques for providing current data may also be useful.

As for the analyzer, it includes various modules for analyzing data from the data source. For example, the modules analyze the historical and current data to generate location recommendations. The recommendations may be stored, for example, in the data source. Analytics may be performed for system evaluation and improvement. In one implementation, the analyzer includes a map segmentation module 262 demand estimation module 264, a candidate location generation module 266 and a location selection module 268. Providing the analyzer with other modules may also be useful. The various modules may be contained in a single server. Providing the modules in different servers may also be useful.

The map segmentation module contains a map of a geographical region of interest. The region of interest, for example, may be a town or a city. Other sized regions of interest covered by the map may also be useful. For example, the region of interest be a state or even larger. The size of the region of interest should be sufficient to cover the region serviced by the public service vehicles.

The map is divided into segments or regions. For example, the map may include a set of regions $R_n$, where n is from 1 to N. The segmented map facilitates estimating demand in each region. In one implementation, the map may be divided into a grid with rectangular segments or regions. The regions of the grid may have the same size. For example, the grid is segmented into regions of equal size. The size of the regions or segments may depend on the desired granularity. For example, the smaller the region, the finer the granularity and vice-versa. The granularity, for example, may be about the size of a block. Other sized segments may also be useful. Providing other configurations of map segmentation may also be useful. For example, the segments may have different shapes, irregular shapes as well as different sizes. The size and shape, for example, may depend on the area covered on the map. For example, the size and shape may follow the streets or shape of the block covered by the segment.

The map segmentation may be performed by the map segmentation module. For example, a user may define the area of interest and size of the segments. The user, for example, may be an administrator of the recommendation system. Other types of users may also be useful. In other embodiments, the map segmentation is provided to the map segmentation module. For example, the map is already defined and segmented.

Figure 3:
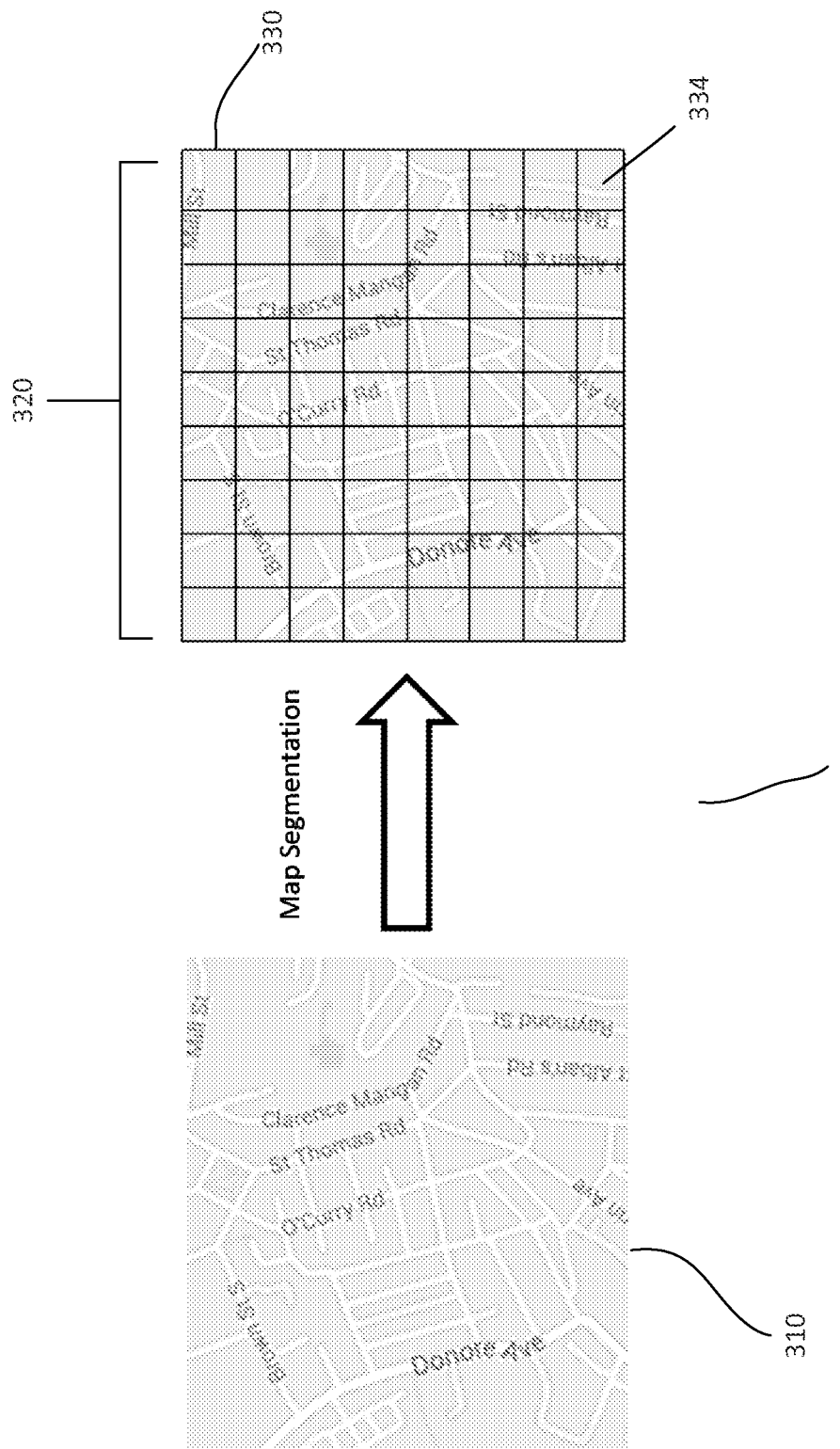
FIG. 3 illustrates a segmented map.

FIG. 3 shows an example 300 of a map segmentation. As shown, a map 310 is provided. The map, for example, is a map of a portion of an area of interest. For example, the map shows a portion of a city. The map segmentation module, for example, enables a user to focus in or show a portion of the map in detail. A segmented map 320 of the portion of the city is shown. The map, for example, is divided into a grid 330 with segments 334. The segments, as shown, are rectangles of equal size. Other configurations of map segmentation may also be useful.

The demand estimation module estimates demand based on historical call data. In one implementation, the demand estimation is based on segments of the map. For example, each segment is analyzed using historical call data to estimate the demand in the respective segments.

The historical call data of each segment is analyzed to estimate probability distribution. In one embodiment, the historical call data is analyzed to estimate a Poisson distribution parameter lambda. Other types of distributions may also useful. The probability function P may be determined by equation 1 as follows:

$$P(X = k) = \frac{\lambda^k e^{-\lambda}}{k!} \quad \text{Equation 1}$$

where
  e is the Euler number which is approximately equal to 2.71828 . . . ,
  k is an integer that equals to the number of people who demands service, such as a taxi service,
  k! is the factorial of k, and
  λ is a parameter of the Poisson distribution which is estimated from the historical data.

The parameter λ is also the expected value and variance of the related Poisson distribution.

An example illustrating the demand estimation is provided. For example, a segment of the map receives 100 calls from 5 PM-6 PM requesting for taxi services. The 1 hour interval is separated into six 10 minute intervals. Table 2 below shows the number of calls within each 10 minute interval between 5 PM-6 PM:

TABLE 2

| Time Interval | The Number of People |
|---|---|
| 1 | 5 |
| 2 | 10 |
| 3 | 20 |
| 4 | 30 |
| 5 | 25 |
| 6 | 10 |

Although the example divides the time interval into six 10 minute intervals, other number of intervals or durations may also be useful. For example, a day may be divided into 12 hourly intervals or 24 half hourly intervals, a week may be divided into seven daily intervals. Other granularity of intervals and durations may also be useful.

Using the historical data, the Poisson parameter λ is estimated, which is equal to the total number of calls divided by the number of intervals. In this case, $$\lambda = \frac{100}{6} = 16.67.$$

Using equation 1, the probability of the number of people (demand estimation) who will call a taxi service in another day between 5 PM-6 PM can be estimated. The demand estimation is performed for each map segment.

Temporal patterns (weekly, monthly) are also considered in the estimation. For example, when we want to estimate the lambda parameter for 5 PM-6 PM on a Wednesday, we will use only historical data on Wednesday. This may be because historical data on Sunday from 5 PM-6 PM may not have the same pattern compared to Wednesday. In the case of weekly patterns, we may compare specific weeks of a month while monthly patterns may compare specific months of a year. Other temporal patterns having different durations may also be useful. For example, temporal patterns may include weekday patterns of a week or rush hour patterns of a day.

Figure 4:
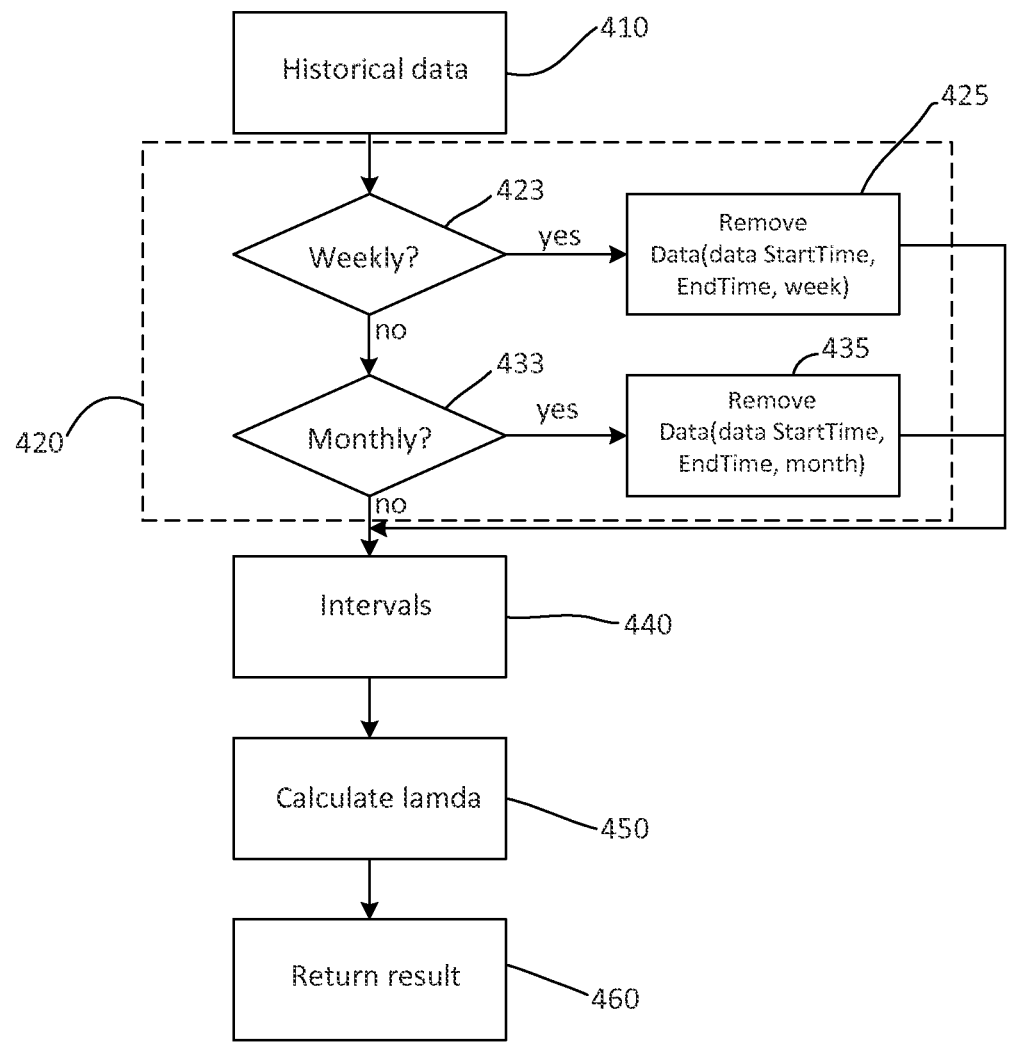
FIG. 4 shows a process for calculating lambda.

FIG. 4 shows an embodiment of a process 400 for calculating lambda λ based on historical call data. The process, at step 410 retrieves historical call data. For example, the historical call data is retrieved from the data source. The historical call data may be referred to as an HDatabase. The call data provides as input a start time (StartTime) of a trip based on time of call of a service request as well as an end time (EndTime) of the trip based on the end of the service request. For example, in the case of a taxi call, the StartTime begins from when the taxi picks up a passenger at the pickup point and ends when the taxi drops the passenger at the drop off point.

At step 420, the process filters historical call data, if applicable, for processing. For example, non-relevant call data is removed from the set of historical call data. In one embodiment, the filters may include weekly and monthly temporal pattern filters. For example, a user may select weekly or monthly temporal pattern filtering or no temporal pattern filtering.

In one embodiment, the process at step 423 determines if a weekly temporal pattern filtering is selected. If a weekly temporal pattern filtering is selected, the process proceeds to step 425 to remove non-relevant call data from the data set. For example, call data with a time stamp which fails within non-relevant weeks is removed. This leaves the data set with relevant call data based on the weekly temporal pattern filtering.

On the other hand, if a weekly temporal pattern filtering is not selected, the process proceeds to 433 to determine if monthly pattern filtering is selected. If monthly temporal pattern filtering is selected, the process proceeds to step 435 to remove non-relevant call data from the data set. For example, call data with a time stamp which falls within non-relevant months is removed. This leaves the data set with relevant call data based on the monthly temporal pattern filtering. After filtering, the process proceeds to step 440 to process the filtered data set. If neither weekly nor monthly pattern filtering is selected, no filtering is needed and the process proceeds to step 440 to process the data set.

The process, at step 440, analyzes the data set. In one embodiment, the analysis includes counting the number of calls for each interval defined, for example, by the user. This, for example, generates call counts table, such as Table 2. At step 450, the process determines lambda λ, which is the total number of calls divided by the number of intervals. The process terminates at step 460 by providing λ as an output.

As described, the process provides a user with options for selecting the desired predefined temporal pattern filtering, such as weekly, monthly or none. For example, predefined temporal pattern filtering options are provided for the user to select. In other embodiments, the process may allow a user to enter parameters to define the desired temporal pattern filter. This provides greater flexibility regarding temporal pattern filtering.

An example of a pseudo code for determining lambda is shown as follows:

Input: start time (StartTime) and end time (EndTime) for estimation
    ## Input: the historical database (HDatabase)
    ## Input: the number intervals (NumIntervals)
    ## Input: if consider the weekly/monthly pattern or not (WPattern, MPattern)
    ## Output: the Poisson parameter (λ)
1 LambdaEstimation(StartTime, EndTime, HDatabase, NumIntervals, WPattern, MPattern)
2 data<--getHistoricalData(StartTime, EndTime, HDatabase) ## get the historical data from database
3 if(WPattern==true) removeData(data, StartTime, EndTime, week) ## remove unrelated data
4 if(MPattern==true) removeData(data, StartTime, EndTime, month) ## remove unrelated data
5 counterIntervals[NumIntervals]=countTheData(data, NumIntervals) ## count the number of data in ## each interval
6 lambda<--countIntervals[NumIntervals])/NumIntervals ## calculate lambda
7 return lambda As discussed, historical call data may be updated periodically. For example, historical call data may be updated on a daily basis, weekly basis or monthly basis. When the historical call data is updated, the system may update the demand distribution to reflect the most recent demand change.

The candidate location generation module 266 generates a list of candidate locations. The candidate locations are based on the demand estimation generated by the demand estimation module. The candidate location generation module, in one implementation, generates a list of locations and their estimated values. The estimated values, for example, indicate the monetary value of the request or call. In the case of taxi services, the value may relate to the estimated amount of the taxi fare. In the case of ambulances, fire trucks and police cars, the value may be based on the priority of an incident. For example, the value or priority may be based on property value, level or risk or threat to life. Other factors to determine value may also useful.

In one implementation, the demand estimation module 264 estimates the demand distribution for segments for a specific time interval. The candidate location module estimates the values of the estimated demands for the specific time interval. The values, for example, may be estimated using a normal distribution. Other techniques for estimating values may also be useful. The estimated values may be determined by the probability function P (equation 2) as follows:

$$P(x) = \frac{1}{\sigma\sqrt{2\pi}} e^{-\frac{(x-\mu)^2}{2\sigma^2}}$$ Equation 2 where

μ is the expected value of a normal distribution, and
σ² is the deviation of the normal distribution.

Using the example of Table 2, the first time interval has 5 calls. The value of each call is provided in Table 3 below:

TABLE 3

| Order ID | Value |
|---|---|
| 1 | $ 5 |
| 2 | $10 |
| 3 | $20 |
| 4 | $30 |
| 5 | $10 |

The expected value μ and standard deviation can be determined from the data in Table 3. For example, expected value μ is equal to the average of the values in Table 3. The deviation of σ² the normal distribution can be obtained from μ. In this case, σ²=100.

As described, the candidate location module employs both the Poisson distribution and the Normal distribution to generate candidate locations. For example, X is the number of passengers who will call a taxi service in a given region at a given time and Y is the value of an order for a passenger. The value X is determined by a Poission distribution while Y is determined by a normal distribution.

In one implementation, the candidate location module determines the candidate location which has a probability of at least k passengers calling for taxis and at least one call will have a value which is higher than m. The probability can be determined using equation 3 as follows:

$$(X > k, Y > m) = \left(e^{-\lambda} \sum_{i=0}^{k} \frac{\lambda^i}{i!}\right) * \left(\frac{1}{2}\left(1 + \mathrm{ERF}\left(\frac{m-\mu}{\sigma\sqrt{2}}\right)\right)\right) \quad \text{Equation 3}$$

where $$e^{-\lambda} \sum_{i=0}^{k} \frac{\lambda^i}{i!}$$

is the cumulative distribution function for Poisson distribution with parameter $\lambda$.

$$\frac{1}{2}\left(1 + \mathrm{ERF}\left(\frac{m-\mu}{\sigma\sqrt{2}}\right)\right)$$

Is the cumulative distribution function for normal distribution with parameter $\mu$ & $\sigma$, and ERF(x) is the standard error function $$\mathrm{ERF}(x) = \frac{2}{\sqrt{\pi}} \int_0^x e^{-t^2} dt.$$

As an example, if a driver is in a specific segment, such as region A at time T, the candidate location module can determine the $p_A(X>k, Y>m, T=t)$ for region A at time T. If the driver can drive to region B in 10 minutes, the candidate location module can calculate the $p_B(X>k, Y>m, T=t+10)$. The various parameters related to current information may be provided using the modules of the data source which provides current data. This, for example, include APIs which provide real-time traffic information as well as current location of vehicles. Some parameters, such as threshold parameters may be provided by the user. For example, m and k may be provided by a user. The user may be the administrator or a dispatcher. Providing parameters by other types of users may also be useful.

In one implementation, the candidate location module calculates the probability for all regions given the current location of a driver or vehicle. Based on the probability, a list of candidate locations may be generated.

Figure 5:
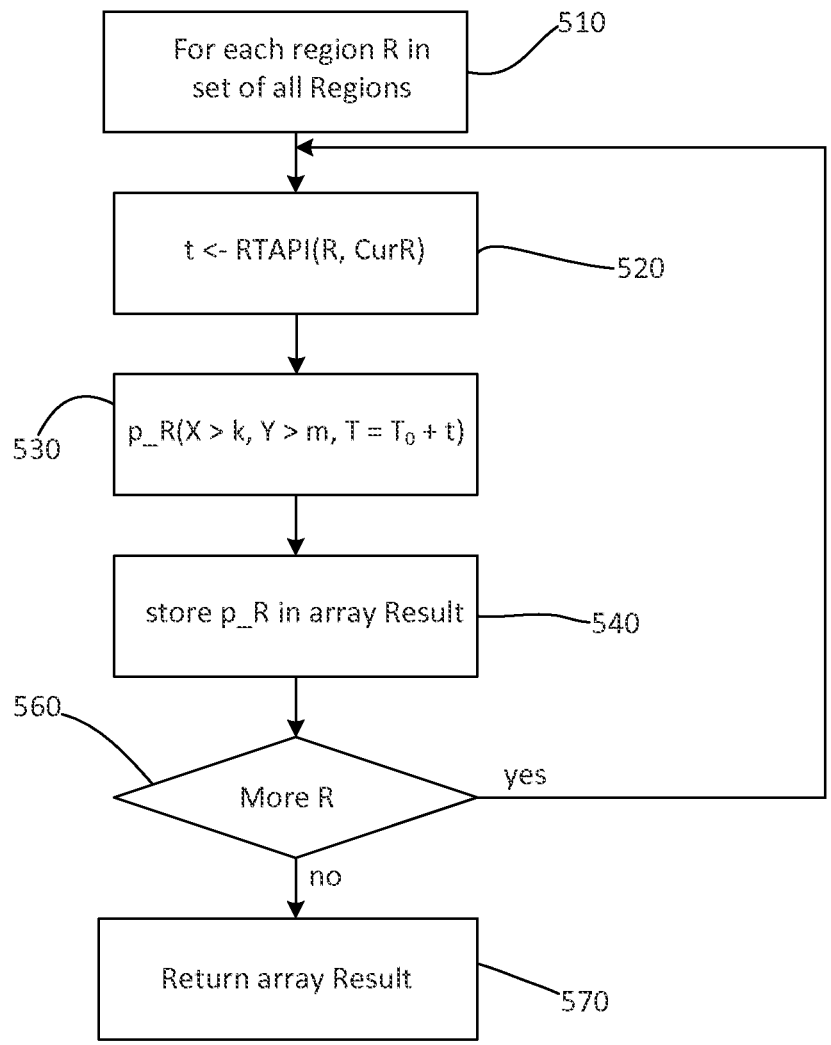
FIG. 5 shows a process for determining probability of regions.

FIG. 5 shows an embodiment of a process 500 for generating a candidate list of regions based on current information given a minimum value and minimum demand. The process, at step 510, performs an analysis of a base region $R_b$ of the map with respect to other regions $R_n$ of the map, where n is equal to 1 to N and $\neq b$. For example, a map includes a set of regions $R_n$, where n is from 1 to N. The base region $R_b$ may be the region where a vehicle of interest is currently located. For example, the base region may be a current region CurR (e.g., $R_b$) of the vehicle of interest. In one implementation, the process analyzes CurR with respect to each region $R_n$, where n$\neq$b.

At step 520, the process calculates a time t from CurR to another region $R_n$ in the map. The time may be calculated using current information. The current information may include real-time traffic information from a real-time API (RTAPI) such as Google map. For example, t<–RTAPI($R_n$, CurR).

Once t is calculated for $R_n$, the probability of $R_n$ (p_$R_n$) is determined at step 530. In one implementation, p_$R_n$ is based on a minimum demand and minimum value. For example, p_$R_n$ is based on X>k and Y>m, where X the number of calls greater than the calls k and Y is the value of the call which is greater than the minimum value m. For example, p_$R_n$ may be calculated using equation 3.

In one implementation, p_$R_n$ takes t into account. For example, p_$R_n$ may allot a time t from CurR to $R_n$. The allotted time, for example, may be 10 minutes (t=10 minutes). The probability may be p_$R_n$(X>k, Y>m, T=$T_0$+t), where $T_0$ is the current time T and t is the allotted amount of time within which a vehicle can travel to $R_n$ from CurR. In such cases, $\lambda$ is based on the new time T, which is equal to $T_0$+t. For example, $\lambda$ is recalculated using new time T. The probabilities from equation 3 are based on the recalculated $\lambda$.

The probability p_$R_n$, in one implementation, is stored in a probability array at step 540. The probability array, for example, is the array Result. At step 560, the process determines if there are more regions to analyze. If so, the process returns to step 520 to process the next region until all regions are analyzed. When all regions are analyzed, the process 570 returns the array Result with the probabilities p_$R_n$ for all regions with respect to CurR.

As described, the process analyzes a CurR with respect to $R_n$. The region CurR, for example, is the location of a vehicle requesting a recommendation. The process generates a list of candidate locations for the requesting vehicle. The list, for example, is based on p_$R_n$. For example, the list may contain the H number of locations with the highest p_$R_n$. The value H may be equal to 10. Providing other values of H may also be useful.

In some cases, the process may be modified to calculate p_$R_n$ for all CurR in the map. For example, the analysis may analyze each region of the map as CurR. For example, CurR, it determines p_$R_n$. This may be useful, for example, in the case of a dispatcher which has numerous vehicles to manage. For example, a master list of candidate locations for each region is provided with respect to other regions of the map may be generated. Using this master list, the dispatcher may provide recommendations accordingly. Other configurations of analyzing p_$R_n$ may also be useful.

An example of a pseudo code for generating location recommendations for all regions based on a given current location of a driver is shown as follows:

```
Input: the current region of a driver (CurR)
Input: the current time (T_0)
Input: a set of all other regions on the map (AllRegion)
Input: Real-time traffic information API to calculate the driving time from a region to another
region (RTAPI)
Input: the minimum number of passengers that will call taxi service (k)
Input: the minimum expected value for a passenger (m)
Output: the probability that the region fit the minimum requirement (k and m)
for each region R in AllRegion
calculate t<–RTAPI(R, CurR)
calculate p_R(X>k, Y>m, T=t_0+t)
store p_R in the result array Result
end for
output Result Array
```

The location selection module selects a location or segment to recommend from the list of candidate locations. The location selection module may select the location or segment based on a driver's preference. For example, in the case of taxi drivers, the driver may provide preferences, such as minimum value or locations. Other driver preferences may also be useful. Driver preferences may be provided by the driver when requesting recommendations. Alternatively, driver preferences may be previously provided by the driver, such as when registering with the system. In such cases, the preferences may be stored in the system. Other configurations of driver preferences may also be useful. A list of top Z segments or regions having the highest probability that fit the driver's requirements may be provided. In other cases, where no driver preferences are provided, a list of top Z segments or regions having the highest probability is automatically selected.

In one implementation, the location selection module includes a location selection recommendation counter or tracker. The location recommendation selection counter tracks the number of recommendations provided to different locations. For example, based on historical demand for a specific time interval, a threshold may be set. The threshold, for example, is the average call for that segment at the time interval. If recommendations to that segment exceeds the threshold, the location selection module removes that segment from further recommendations. The results are sent to the user, such as a driver or a dispatcher. In one implementation, the results are sent to the client side component.

The client side component, as shown includes a user interface (UI) module 274 and a GIS module 272. The UI module, for example, enables the user to access and navigate the recommendation system as well as to provide input information, such as user preferences. The GIS module, for example, may display the location recommendations on a map which is displayed on the user device. Providing the client component with other modules may also be useful.

As described, the various modules of the recommendation system may be embodied as an application. For example, the various modules may be embodied as a software application. The modules may be integrated into an existing software application, as an add-on or plug-in to an existing application or as a separate stand-alone application. The source code of the application may be compiled to create an executable code. The codes, for example, may be stored in a storage medium such as one or more storage disks. Other types of storage mediums may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method performed by a computer system that comprises a server and a plurality of client user devices, the server providing a framework useable in generating a display of a navigational aid that includes location recommendations, the method comprising:
   receiving by the framework, over a first computer network, from a first client user device of the plurality of client user devices and associated with at least one user, a location identifier of a user associated with a respective user device, the location identifier being determined by a communication device or GPS data;
   with the framework:
      providing a first map to the computer system, the first map being of a geographical area of interest and segmented into N number of regions;
      determining a time frame of interest;
      dividing the time frame of interest into a number of intervals;
      providing current data, the current data comprising real-time traffic data automatically retrieved from a real-time graphical information navigation service with real-time traffic flow data via an API call to the real-time graphical information navigation service;
      analyzing, by the server, historical call data to estimate demand distributions, the estimating comprising calculating $\lambda_n$ for at least regions n=1 to N, other than where n corresponds to a region associated with the location identifier, wherein $\lambda_n$ is equal to a total number of calls received from region n divided by the number of intervals into which the time frame of interest is divided, the estimating demand distributions being based at least in part on the location identifier;
      calculating, by the server, call probabilities, the calculating comprising calculating call probabilities for at least regions n=1 to N, other than where n corresponds to a region associated with the location identifier, wherein calculating the call probabilities comprises estimating a time for reaching the region n from a current position and based on the current data, wherein the call probability for the region n is based on the estimated demand distributions and an identified interval determined using the estimated time;
      generating, by the server, a list of candidate locations to recommend to a user, the list of candidate locations comprising at least a portion of candidate locations having a threshold highest probability for respective regions of the N number of regions; and
      sending at least a portion of the list of candidate locations to the first client user device;
   by the first client user device:
      receiving the at least a portion of the list of candidate locations from the framework;
      selecting a location of the list of candidate locations as a recommended location; and
      generating an updated map interface for display to a user, the generating comprising:
         retrieving data defining a second map;
         determining a portion of the second map corresponding to the recommended location of the list of candidate locations;
         generating a map overlay corresponding to the portion of the second map corresponding to the region comprising the selected location, and including a visual indication of the selected location;
         displaying the second map; and
         displaying the map overlay over the second map, thereby providing a location recommendation to the at least one user of the first client user device.

2. The computer-implemented method of claim 1, wherein the historical call data comprises historical call data for taxis.

3. The computer-implemented method of claim 1, wherein the current data further comprises a vehicle status.

4. The computer-implemented method of claim 1 wherein calculating $\lambda_n$ comprises temporal filtering of the historical call data.

5. The computer-implemented method of claim 1 wherein the time frame of interest has a start time and an end time $\lambda_n$, the Poisson distribution of region n, and estimating the demand distributions comprises:

retrieving call records from the historical call data having a start call time which is within the period of interest, the retrieved call records form a retrieved call records data set;

if temporal filtering is selected, filtering the retrieved call records data set to remove non-relevant call records based on temporal filtering selected, wherein relevant call records is the relevant call records data set; and if no temporal filtering is selected, the retrieved call records data set is the relevant call records data set.

6. The computer-implemented method of claim 5 wherein temporal filtering comprises weekly temporal filtering and monthly temporal filtering.

7. The computer-implemented method of claim 5 wherein the demand distribution for each region is $$P(X=k) = \frac{\lambda^k e^{-\lambda}}{k!},$$

where e is the Euler number, k is an integer that equals to the number of calls in region n, k! is the factorial of k, and $\lambda$ is Poisson distribution for region n.

8. The computer-implemented method of claim 7 wherein the demand distribution in region n is $X_n$, which is the number of calls estimated in region n, and is based on a Poisson distribution.

9. The computer-implemented method of claim 8 wherein generating the list of candidate locations comprises estimating a value $Y_n$ of $X_n$ in region n.

10. The computer-implemented method of claim 9 wherein the estimated value $Y_n$ is equal to $$P(x) = \frac{1}{\sigma\sqrt{2\pi}} e^{-\frac{(x-\mu)^2}{2\sigma^2}}$$

where $\mu$ is the expected value of a normal distribution, and $\sigma^2$ is the deviation of the normal distribution.

11. The computer-implemented method of claim 10 wherein the list of candidate locations comprises locations which have a probability of at least k passengers calling and at least one call will have a value which is higher than m.

12. The computer-implemented method of claim 11 wherein selecting a location of the list of candidate locations comprises selecting a location from the list of candidate locations to recommend to the user based on the user's preferences.

13. The computer-implemented method of claim 11, wherein selecting a location of the list of candidate locations comprises selecting a location from the list of candidate locations to recommend to the user based on the user's preferences and which does not exceed a recommendation threshold count.

14. The computer-implemented method of claim 1 wherein the historical call data is stored in a database in a table having an attribute for vehicle ID, an attribute for starting point, an attribute for starting time, an attribute for destination point, and an attribute for arrival time.

15. The computer-implemented method of claim 1, further comprising:

receiving user input specifying a predefined temporal pattern for use in filtering the historical call data.

16. The computer-implemented method of claim 1, further comprising:

assigning estimated priority values to locations of the list of candidate locations.

17. A computing device comprising one or more processors and one or more computer-readable storage medium coupled to the one or more processors and storing instructions for causing the computing device to implement a location recommendation framework accessible to a plurality of client user devices and useable in rendering a navigational aid on a client user device of the plurality of client user devices, the location recommendation framework comprising:

a data source comprising:
  a historical data module, the historical module comprising historical call records;
  a current data module, the current data module is provided with current data, the current data comprising a location identifier received over a first computer communication network from a client user device, from among the plurality of client user devices, of at least one user, the location identifier being determined by a communication device or GPS data, the current data further comprising real-time traffic data automatically retrieved from a real-time graphical information navigation service with real-time traffic flow data; and an analyzer comprising:
  a map segmentation module, the map segmentation module comprising a first map of a geographical area of interest segmented into N number of regions,
  a demand estimation module, the demand estimation module receiving a time frame of interest and dividing the time frame of interest into a number of intervals, wherein the demand estimation module analyzes the historical call records in the historical data module to estimate demand distributions, the demand estimation module comprising computer-executable instructions for performing operations comprising calculating $\lambda_n$ for at least regions n=1 to N, other than where n corresponds to a region associated with the location identifier, where $\lambda_n$ is equal to a total number of calls received from region n divided by the number of intervals into which the time frame of interest is divided, the estimating demand distributions being based at least in part on the location identifier,
  a probability estimation module, the probability estimation module calculating call probabilities for at least regions n=1 to N, other than where n corresponds to a region associated with the location identifier, wherein calculating the call probabilities comprises estimating a time for reaching the region n from a current position and based on the current data, wherein the call probability for the region n is based on the estimated demand distributions and an identified interval determined using the estimated time;
  a candidate location generation module for generating a list of candidate locations based on the demand distributions and current data, the list of candidate locations comprising at least a portion of candidate locations satisfying a threshold probability for respective regions of the N number of regions, a location selection module, the location selection module selecting a selected location from the list of candidate locations as a selected location to recommend to a user; and a communication module, the communication module receiving the location identifier from the client user device over the first communication network and sending the selected location to the client user device over a communication network, wherein the client user device:

receives the selected location from the communication module;

retrieves data defining a second map;

determines a portion of the second map corresponding to the selected location;

generates a map overlay corresponding to the portion of the second map corresponding to the selected location, and including a visual indication of the selected location;

displays the second map; and displays the map overlay over the second map, thereby providing a location recommendation to the at least one user of the client user device.

18. The computing device of claim 17 wherein the demand estimation module determines the demand distribution for each region by $$P(X = k) = \frac{\lambda^k e^{-\lambda}}{k!},$$

where e is the Euler number, k is an integer that equals to the number of calls in region n, k! is the factorial of k, and $\lambda$ is Poisson distribution for region n.

19. A non-transitory computer-readable medium having stored thereon a program code, the program code is executable by a computer for implementing a framework service usable in generating a navigational aid displaying recommendations of locations on a map associated with a user client device having access to the framework service, the program code comprising instructions for performing operations comprising:

receiving by the framework, over a first computer network, from the client user device of at least one user, a location identifier of the user associated with the client user device, the location identifier being determined by a communication device or GPS data;

providing a first map of a geographical area of interest segmented into N number of regions to a computer system;

determining a time frame of interest;

dividing the time frame of interest into a number of intervals;

receiving current data, the current data comprising real-time traffic data automatically retrieved from a real-time graphical information navigation service with real-time traffic flow data;

analyzing historical call data to estimate demand distributions, the estimating comprising calculating $\lambda_n$ for at least regions n=1 to N, other than where n corresponds to a region associated with the location identifier, wherein $\lambda_n$ is equal to a total number of calls received from region n divided by the number of intervals into which the time frame of interest is divided, the estimating demand distributions being based at least in part on the location identifier;

calculating call probabilities, the calculating comprising calculating call probabilities for at least regions n=1 to N, other than where n corresponds to a region associated with the location identifier, wherein calculating the call probabilities comprises estimating a time for reaching the region n from a current position and based on the current data, wherein the call probability for the region n is based on the estimated demand distributions and an identified interval determined using the estimated time;

generating a list of candidate locations to recommend to a user, the list of candidate locations comprising a set of most probable candidate locations of the candidate locations; and sending at least a portion the list of candidate locations, or a display based at least in part on the list of candidate locations, to the first user device, wherein the first user device receives the list of candidate locations and generates a navigational aid, the generating comprising:

retrieving data defining a second map;

determining a portion of the second map corresponding to at least a selected location of the list of candidate locations;

generating a map overlay corresponding to the portion of the second map corresponding to the region comprising the selected location, and including a visual indication of the selected location;

displaying the second map having the overlay indicating the selected location.

20. The non-transitory computer-readable medium of claim 19 wherein calculating $\lambda_n$ comprises temporal filtering of the historical call data.

* * * * *